(12) United States Patent
Yamashita

(10) Patent No.: US 8,542,263 B2
(45) Date of Patent: Sep. 24, 2013

(54) MOUNTING STRUCTURE OF A MOUNTED COMPONENT, LIGHT SCANNING DEVICE, AND IMAGE FORMING APPARATUS

(75) Inventor: Masahiro Yamashita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 527 days.

(21) Appl. No.: 12/868,178

(22) Filed: Aug. 25, 2010

(65) Prior Publication Data
US 2011/0222132 A1  Sep. 15, 2011

(30) Foreign Application Priority Data

Mar. 15, 2010 (JP) .................................. 2010-058177

(51) Int. Cl.
*B41J 15/14* (2006.01)
*B41J 27/00* (2006.01)
(52) U.S. Cl.
USPC .......................................... 347/242; 347/257
(58) Field of Classification Search
USPC .................. 347/238, 241–245, 256–261, 263
See application file for complete search history.

(56) References Cited

U.S. PATENT DOCUMENTS

| | | | | |
|---|---|---|---|---|
| 4,918,702 A | * | 4/1990 | Kimura | 372/34 |
| 5,255,015 A | * | 10/1993 | Noethen et al. | 347/257 |
| 5,758,950 A | * | 6/1998 | Naoe et al. | 362/259 |
| 6,798,820 B2 | * | 9/2004 | Okuwaki et al. | 372/107 |
| 7,508,859 B2 | * | 3/2009 | Azami et al. | 372/101 |

FOREIGN PATENT DOCUMENTS

| | | |
|---|---|---|
| JP | A-5-273483 | 10/1993 |
| JP | A-2009-2988 | 1/2009 |

* cited by examiner

*Primary Examiner* — Hai C Pham
(74) *Attorney, Agent, or Firm* — Oliff & Berridge, PLC

(57) ABSTRACT

There is provided a mounting structure of a mounted component, including: a holding member that holds a mounted component including a light source and of which position is adjusted within a plane substantially orthogonal to an optical axis of the light source; a shaft portion that projects from a side surface of a case body in which the light source is provided, in a direction along the optical axis of the light source; and a fixing member in which a contact portion coming into contact with the shaft portion is provided, wherein in a state in which the contact portion contacts the shaft portion, rotation of the fixing member is limited in an allowable range, and the fixing member is made to adhere to a surface of the holding member facing toward the fixing member in the direction along the optical axis, and is fixed to the shaft portion.

11 Claims, 14 Drawing Sheets

MOUNTING STRUCTURE OF A MOUNTED COMPONENT, LIGHT SCANNING DEVICE, AND IMAGE FORMING APPARATUS

CROSS-REFERENCE TO RELATED APPLICATION

This application is based on and claims priority under 35 USC 119 from Japanese Patent Application No. 2010-058177 filed on Mar. 15, 2010.

BACKGROUND

1. Technical Field

The present invention relates to a mounting structure of a mounted component, a light scanning device, and an image forming apparatus.

2. Related Art

There is a related art in which a shaft of a collimator-lens holder is fixed to a fixing member by being bonded to the hole formed on the fixing member.

SUMMARY

A mounting structure for a mounted component according to an aspect of the invention includes: a holding member that holds a mounted component including a light source or an optical component, the position of the holding member being adjusted within a plane that is substantially orthogonal to an optical axis of the light source or of the optical component; a shaft portion that projects from a side surface of a case body in which the light source or the optical component is provided, in a direction along the optical axis of the light source or of the optical component; and a fixing member in which a contact portion that contacts the shaft portion is provided, wherein in a state in which the contact portion contacts the shaft portion, rotation of the fixing member around two axes that are substantially orthogonal to the optical axis is limited to an allowable range, and the fixing member is adhered, by a cured resin cured by a curing member, to a surface of the holding member facing toward the fixing member in the direction along the optical axis, and is fixed by the cured resin to the shaft portion.

BRIEF DESCRIPTION OF THE DRAWINGS

Exemplary embodiments of the invention will be described in detail with reference to the following figures, wherein.

DETAILED DESCRIPTION

Respective examples of a mounting structure of a mounted component, a light scanning device, and an image forming apparatus according to a first exemplary embodiment of the invention are described hereinafter.

Figure 1:
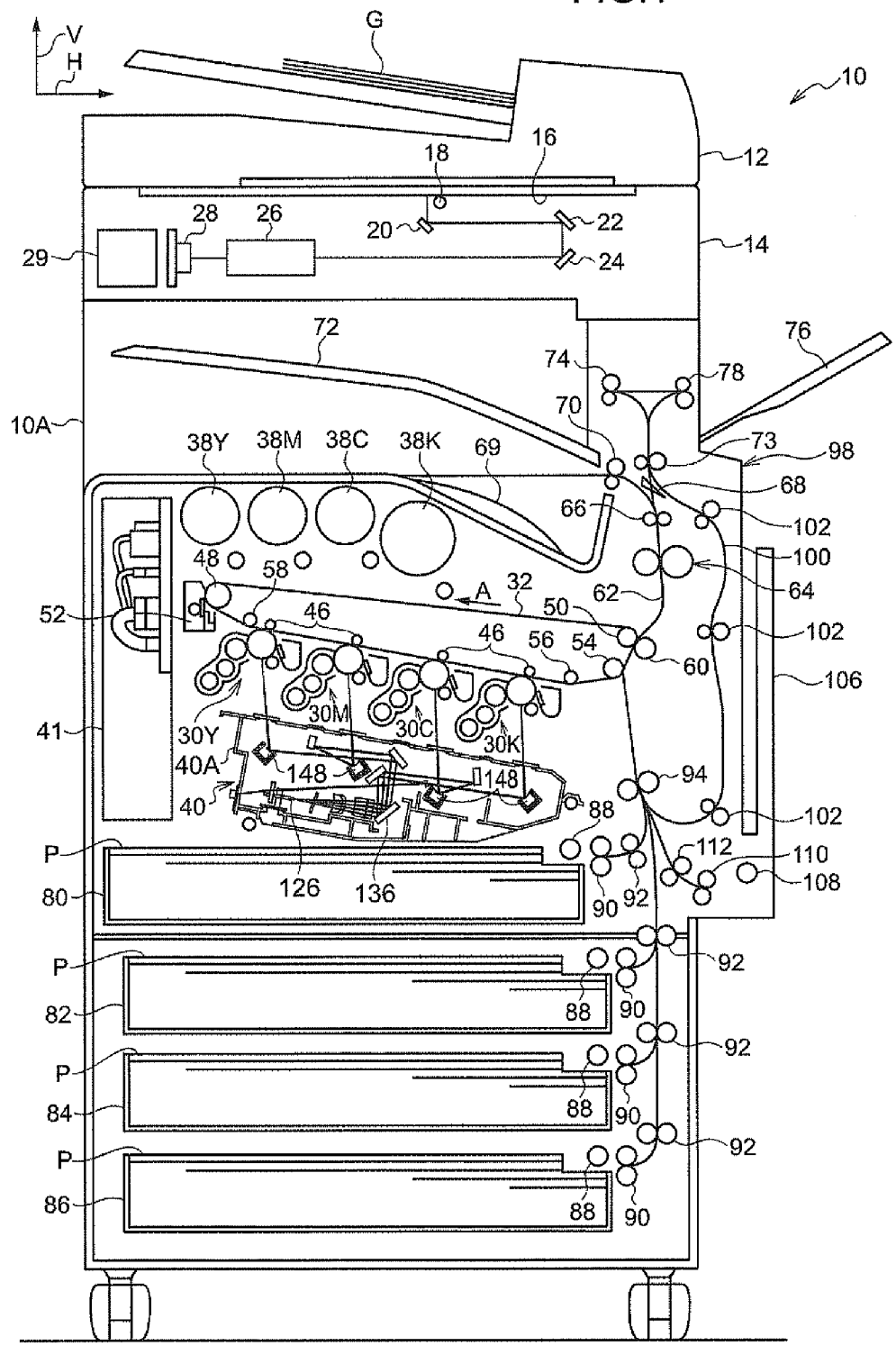
FIG. 1 is an overall diagram of an image forming apparatus according to a first exemplary embodiment of the invention.

FIG. 1 shows an image forming apparatus 10 according to the first exemplary embodiment of the invention. Provided at the upper side of an apparatus main body 10A of the image forming apparatus 10 are: a document transport device 12 that automatically transports plural read documents G one by one; a platen glass 16 on which one read document G is placed; and a document reading device 14 for reading a read document G transported by the document transport device 12 or a read document G placed on the platen glass 16.

The document reading device 14 is provided with a light emitting portion 18 that irradiates light onto the read document G transported by the document transport device 12 or the read document G placed on the platen glass 16. Further, the document reading device 14 is provided with an optical system formed by a full-rate mirror 20 which causes reflected light radiated by the light emitting portion 18 and reflected by the read document G to be reflected in a direction parallel to the platen glass 16, a half-rate mirror 22 which causes the reflected light reflected by the full-rate mirror 20 to be reflected downward, a half-rate mirror 24 which causes the reflected light reflected by the half-rate mirror 22 to be reflected in a direction parallel to the platen glass 16 so that the reflected light is folded back, and an image forming lens 26 into which the reflected light folded back by the half-rate mirror 24 is made incident.

In addition, the document reading device 14 is further provided with a photoelectric transducer 28 that transduces reflected light imaged by the image forming lens 26 to an electric signal, and an image processing device 29 which carries out image processing of an electric signal transduced by the photoelectric transducer 28. Then, the light emitting portion 18, the full-rate mirror 20, the half-rate mirror 22 and the half-rate mirror 24 each can be moved along the platen glass 16.

When the read document G placed on the platen glass 16 is read, the light emitting portion 18 irradiates the read document G which is placed on the platen glass and reflected light reflected by the reading document G is imaged on the photoelectric transducer 28 while the light emitting portion 18, the full-plate mirror 20, the half-rate mirror 22 and the half-rate mirror 24 are being moved. Further, when the read document G transported by the document transport device 12 is read, the light emitting portion 18, the full-rate mirror 20, the half-rate mirror 22 and the half-rate mirror 24 are each stopped at a fixed position, and the light emitting portion 18 irradiates the read document G transported by the document transport device 12, and the reflected light reflected by the read document G is used to form an image.

Plural image forming units 30 are arranged at the central portion of the apparatus main body 10A in the vertical direction (the direction indicated by arrow V) in the state of being inclined with respect to the horizontal direction (the direction indicated by arrow H), and these image forming units are used to form toner images having different colors. Further, an intermediate transfer belt 32, which is an example of an endless transfer object, is provided at the upper side of the image forming units 30 and wound around a drive roll 48 that can be driven to rotate, a tension applying roll 54 which applies tension, a support roll 50 that can be driven to rotate, a first idler roll 56 and a second idler roll 58. Then, due to the intermediate transfer belt 32 circulating in the direction indicated by arrow A (in a counterclockwise direction as illustrated in FIG. 1), toner images formed by the image forming units 30 of various colors are transferred to the intermediate transfer belt 32.

Figure 2:
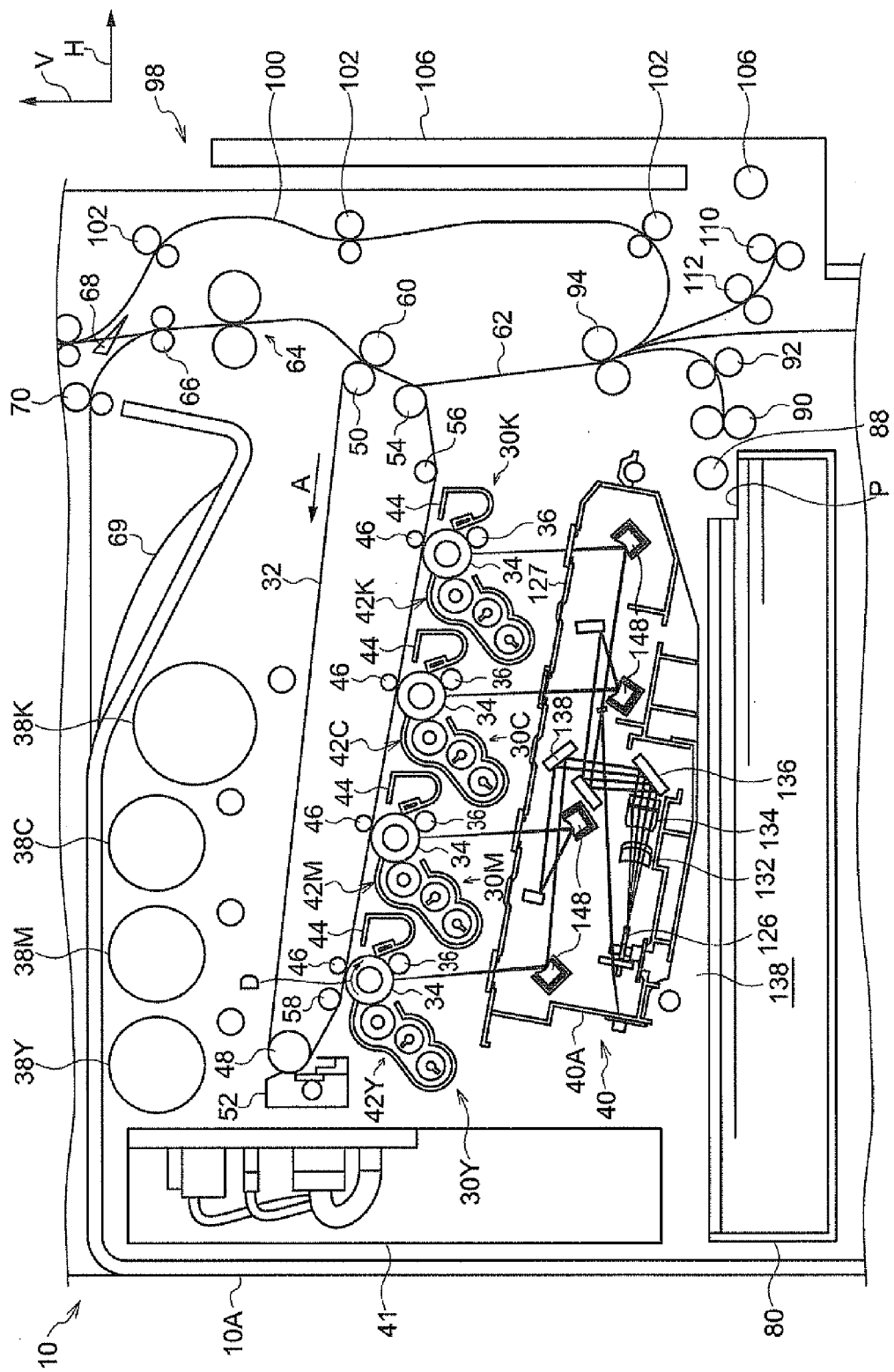
FIG. 2 is a structural diagram of an image forming unit according to a first exemplary embodiment of the invention.

As shown in FIG. 2, the image forming apparatus 10 includes image forming units 30Y, 30M, 30C, and 30K corresponding to four color toners (examples of developer) of yellow (Y), magenta (M), cyan (C), and black (K), respectively, and these image forming units are arranged in the order as mentioned toward a downstream side in the direction in which the intermediate transfer belt 32 moves. The image forming units 30Y, 30M, 30C and 30K are arranged in such a manner that the image forming unit 30Y is provided at the highest position and the image forming unit 30K is provided at the lowest position. The four image forming units are arranged at regular intervals in the state of being diagonally inclined with respect to the horizontal direction. Further, the image forming units 30Y, 30M, 30C and 30K have the same structure with exception of the color of toner to be accommodated therein. Incidentally, it should be noted that in the following description, alphabetic characters (Y, M, C and K) corresponding to four colors of toner are each added to the reference number of the image forming unit when these colors of toner are distinguished from one another, and if not so, the alphabetic characters corresponding to the four colors of toner are not added.

The image forming unit 30 is provided with a photoreceptor 34 which is an example of a latent image holding body and which rotates by a driving unit (not shown) in the direction indicated by arrow D (in the clockwise direction in FIG. 2), and a charging member 36 that charges the surface of the photoreceptor 34 is provided so as to face the surface (outer peripheral surface) of the photoreceptor 34. Further, an exposure unit 40 which is an example of light scanning device is provide below the image forming unit 30, and is disposed so as to be inclined along the plural image forming units 30. The exposure unit 40 includes a mounting structure 170 (see FIG. 5) of a light source unit 130 described later in details, and the surface of the photoreceptor 34 charged by the charging member 36 (at a position further at the downstream side than the charging member 36 in the rotating direction of the photoreceptor 34) is exposed with a laser light corresponding to a fixed color, and an electrostatic latent image is thereby formed.

A developing machine 42 which is an example of developing unit is provided further at the downstream side than a position exposed with a laser light of the exposure unit 40 in the rotating direction of the photoreceptor 34, and visualizes an electrostatic latent image formed on the surface of the photoreceptor 34 by development with a toner of a fixed color. Further, a primary transfer member 46 which is an example of a transfer unit for transferring a toner image formed on the surface of the photoreceptor 34 to the intermediate transfer belt 32 is provided further at the downstream side of the developing machine 42 in the rotating direction of the photoreceptor 34 and disposed at the side opposite to the photoreceptor 34 with respect to the intermediate transfer belt 32.

Moreover, a cleaning device 44 is provided further at the downstream side of the primary transfer member 46 in the rotating direction of the photoreceptor 34 and cleans a toner or the like, which remains on the surface of the photoreceptor 34 without being transferred to the intermediate transfer belt 32. The image forming unit 30 includes the photoreceptor 34, the charging member 36, the developing machine 42, and the cleaning device 44. Incidentally, a control portion 41 which controls operation of each of various portions of the image forming apparatus 10 is provided at a position (in a leftward end portion of FIG. 2) adjacent to the image forming unit 30 and the exposure unit 40.

Provided above the intermediate transfer belt 32 are toner cartridges 38Y, 38M, 38C and 38K which each supply a toner of fixed color to the developing machine 42 of yellow (Y), magenta (M), cyan (C) and black (K), respectively. Since the toner cartridge 38K in which toner of black (K) is accommodated is used very often, the size of the toner cartridge 38K is made larger than the other toner cartridges of colors other than black.

Further, a cleaning device 52 which cleans the surface of the intermediate transfer belt 32 is provided at the side opposite to the drive roll 48 with respect to the intermediate transfer belt 32. The cleaning device 52 is made detachable from the apparatus main body 10A by opening a front cover (not shown) thereof provided at the front side (at which a user would stand) of the apparatus main body 10A.

In addition, a secondary transfer member 60 is provided at the side opposite to the support roll 50 with respect to the intermediate transfer belt 32 and performs secondary transfer of a toner image, which has been subjected to primary transfer to the intermediate transfer belt 32, to a recording sheet P serving as a recording medium. A region between the secondary transfer member 60 and the support roll 50 is formed as a secondary transfer position at which a toner image is transferred to the recording sheet P. A fixing device 64 for fixing the toner image to the recording sheet P to which the toner image is transferred by the secondary transfer member 60 is provided above the secondary transfer member 60. Incidentally, a transport path 62 is provided so as to extend in the vertical direction at the right side of FIG. 2 in the image forming apparatus 10, and the recording sheet P is adapted to be transported upward along the transport path 62.

As shown in FIG. 1, transport rolls 66 that transport the recording sheet P to which a toner image is fixed, to the downstream side are provided further at the downstream side than the fixing device 62 in the direction of transporting the recording sheet P (at the upper side of FIG. 2). Further, a switching gate 68 which swings to switch the direction of transporting the recording sheet P is provided further at the downstream side than the transport rolls 66 in the direction of transporting the recording sheet P.

A first discharging roll 70 is provided further at the downstream side of the switching gate 68 in the direction of transporting the recording sheet P and discharges the recording sheet P guided by the switching gate 68, which is switched to one direction, into a first discharging portion 69. Further, a second discharging roll 74 and a third discharging roll 78 are provided further at the downstream side of the switching gate 68 in the direction of transporting the recording sheet P. The second discharging roll 74 causes the recording sheet P guided by the switching gate 68, which is switched to the other direction, and transported by transport rolls 73 to be discharged into a second discharging portion 72, and the third discharging roll 78 causes the recording sheet P to be discharged into a third discharging portion 76 disposed at the side opposite to the second discharging portion 74.

Sheet feeding portions 80, 82, 84 and 86 having different sizes of recording sheets P accommodated therein are provided at the lower side of the apparatus main body 10A and further at the upstream side (at the lower side of FIG. 1) than the secondary transfer member 60 in the direction of transporting the recording sheet P. The sheet feeding portions 80, 82, 84 and 86 are each provided with a sheet feeding roll 88 which discharges the recording sheet P accommodated therein, from each of the sheet feeding portions 80, 82, 84 and 86. A transport roll 90 and a transport roll 92, each transport the recording sheet P one by one, are provided further at the downstream side than the sheet feeding roll 88. Further, a positioning roll 94 is provided further at the downstream than the transport roll 92 in the direction of transporting the recording sheet P. The positioning roll 94 stops temporarily the recording sheet P and discharges the recording sheet P to the secondary transfer position at a fixed timing.

A duplex transport unit 98 (a transport unit 98 for a sheet having both sides with images formed thereon) is provided by the side (at the right side of FIG. 1) of the secondary transfer position, and inverts and transports the recording sheet P so that images are formed on both sides of the recording sheet P. A reversing path 100 is provided in the duplex transport unit 98 and the recording sheet P is fed into the reversing path 100 by rotating the transport roll 73 in reverse. Further, the duplex transport unit 98 includes plural transport rolls 102 arranged along the reversing path 100, and the recording sheet P is transported again to the positioning roll 94 in the state in which two sides of the recording sheet P are reversed by these transport rolls 102.

Further, a foldable manual sheet feeding portion 106 is provided adjacent to the duplex transport unit 98 (at the right side of the figure). Then, a sheet feeding roll 108, and transport rolls 110, 112 are provided at a position at which the recording sheet P is supplied from the manual sheet feeding portion 106 in the apparatus main body 10A, so that recording sheet P is transported toward the transport path 62. The recording sheet P transported by the transport rolls 110, 112 is transported to the registration roll 94.

Next, an image forming process in the image forming apparatus 10 is described.

As shown in FIG. 1, when the image forming apparatus 10 is operated, respective image data of colors of yellow (Y), magenta (M), cyan (C) and black (K) is sequentially outputted from the image processing device 29 or from the outside to the exposure unit 40. Subsequently, a laser light L (see FIG. 3) emitted from the exposure unit 40 in correspondence with image data is used to expose the surface (outer peripheral surface) of the corresponding photoreceptor 34 charged by the charging member 36, and an electrostatic latent image is formed on the surface of the photoreceptor 34. The electrostatic latent image formed on the surface of the photoreceptor 34 is developed by the developing machines 42Y, 42M, 42C and 42K to form toner images of the colors of yellow (Y), magenta (M), cyan (C) and black (K).

Subsequently, the toner images of the respective colors of yellow (Y), magenta (M), cyan (C) and black (K), which are formed sequentially on the surface of the photoreceptor 34, are sequentially multiply-transferred to the intermediate transfer belt 32 by the primary transfer member 46. Then, the toner images of the respective colors multiply-transferred to the intermediate transfer belt 32 are subjected to secondary transfer by the secondary transfer member 60 onto the recording sheet P transported to the secondary transfer position. The recording sheet P to which the toner images are transferred is transported toward the fixing device 64. In the fixing device 64, the toner images of the colors on the recording sheet P are heated and pressurized, and are thereby fixed on the recording sheet P. Then, the recording sheet P on which the toner image is fixed is, for example, discharged into the first discharging portion 69. Incidentally, when an image is formed on a non-image surface having no image formed thereon (when double-sided printing is performed), an image is fixed on the surface of the recording sheet in the fixing device 64, and thereafter, the recording sheet P is transported into a reversing path 100 and the image is formed and fixed on the back side of the recording sheet.

Next, the exposure unit 40 is described.

Figure 3:
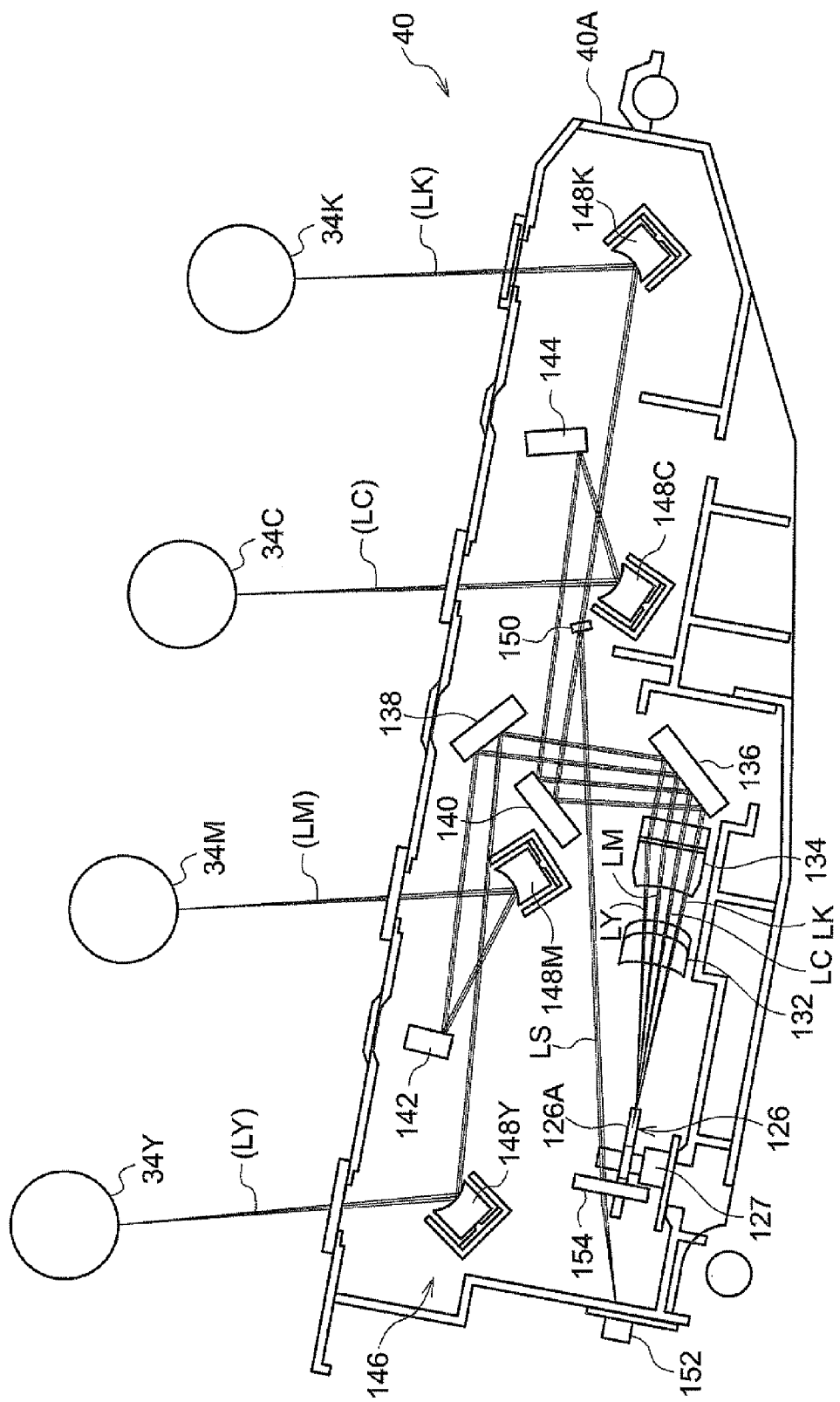
FIG. 3 is a structural diagram of an exposure unit according to a first exemplary embodiment of the invention.

As shown in FIG. 3, the exposure unit 40 is structured in such a manner that laser light LY, LM, LC and LK is irradiated on the four photoreceptors 34Y, 34M, 34C and 34K, respectively, to form an electrostatic latent image on the corresponding photoreceptor 34.

Figure 4:
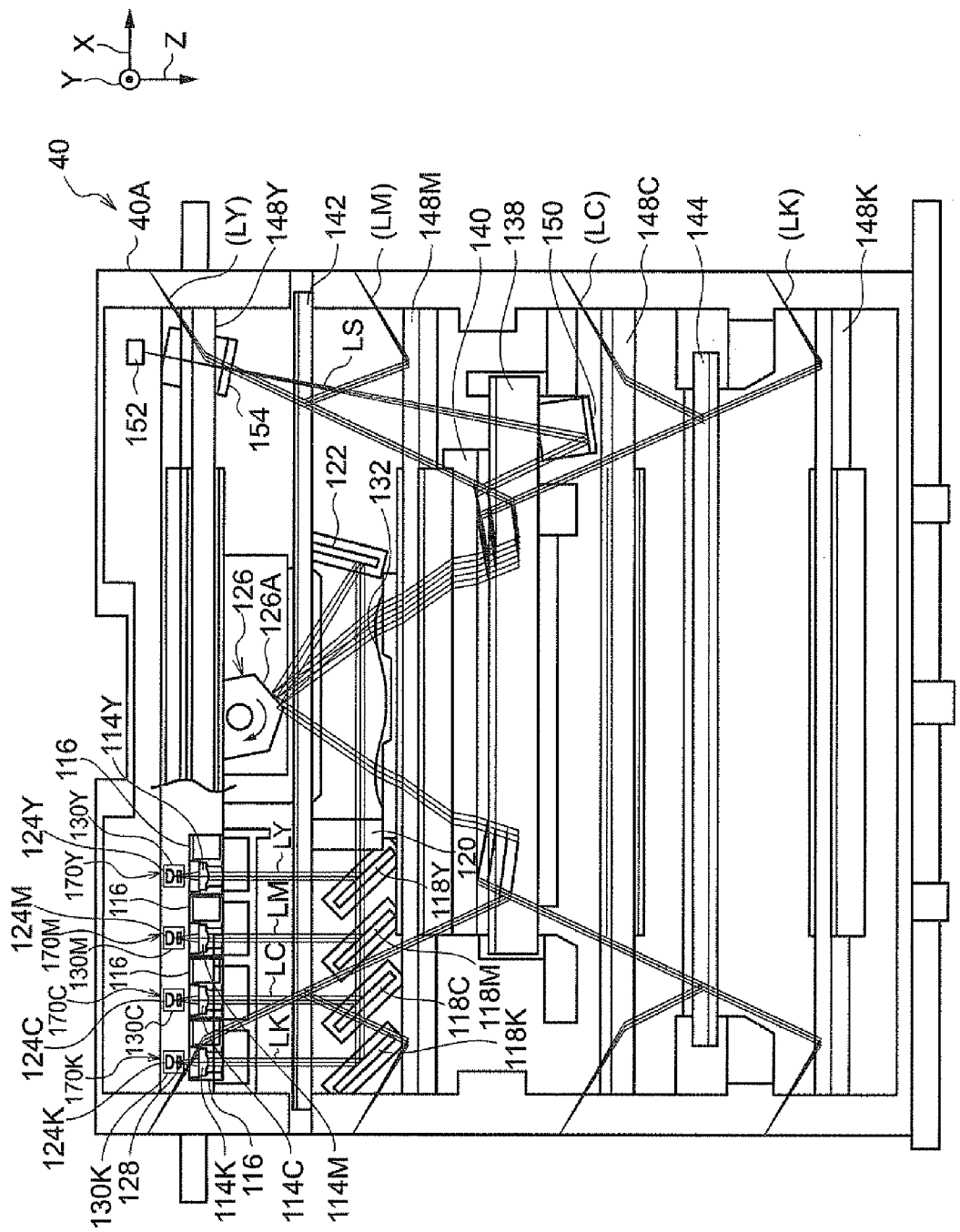
FIG. 4 is a plan view of an exposure unit according to a first exemplary embodiment of the invention.

Specifically, as shown in FIG. 4, the exposure unit 40 includes a case body 40A which is fixed at a determined position of the image forming apparatus 10, and the case body 40A includes light sources 124Y, 124M, 124C and 124K which emit laser light LY for the color of yellow, laser light LM for the color of magenta, laser light LC for the color of cyan and laser light LK for the color of black. As described above, it should be noted that members, which are each provided for the above-described colors, are each shown with alphabetic characters (Y, M, C and K), which represents the four colors, being respectively added to the ends of the reference number of the corresponding member, and if these members are each explained without distinction between the colors, the alphabetic characters representing the colors, which alphabetic characters are to be added to the ends of the reference number of the member, are omitted. Further, the direction indicated by arrow Z coincides with the optical axis direction of the light source 124, the direction indicated by arrow X orthogonal to the direction indicated by arrow Z and coinciding with the horizontal direction (in the direction to the right side of FIG. 4) in the case body 40A, and the direction indicated by arrow Y orthogonal to the direction indicated by arrow X and also to the direction indicated by arrow Z and coinciding with the vertical direction (the direction toward the front of the figure) in the case body 40A.

The exposure unit 40 includes a polygon mirror 126 which is an example of deflector, which mirror has plural (in the present exemplary embodiment, six-sided) reflection surfaces 126A and rotates by a drive motor 127 (see FIG. 3) which is an example of rotating unit, and causes laser light L emitted from the light source 124 to be reflected and also causes the laser light L to scan the photoreceptor 34 (see FIG. 3) in the fast-scan direction (in the direction along the rotating axis of the photoreceptor 34).

Further, a collimator lens 114 which causes laser light L emitted from the light source 124 to become a parallel light so as to correspond to the light sources 124 of each color is provided in an optical path from the light source 124 to the polygon mirror 126 in the state of being held by the lens-barrel member 116. Moreover, a glass plate 128 through which the laser light L emitted from the light source 124 is transmitted is provided between the light source 124 and the lens-barrel member 116. Here, the light source 124 and the glass plate 128 forms a light source unit 130 (see FIG. 7) which is an example of a light source or a mounted component. Incidentally, as described below, in a structure in which the light source unit 130 is fixed and mounted to the case body 40A after the position of the collimator lens 114 is adjusted, the collimator lens 114 forms an example of an optical component or a mounted component.

First plane mirrors 118Y, 118M, 118C and 118K are provided at the downstream side of the optical path of laser light L (hereinafter referred to simply as "the downstream side of the optical path" with the phrase "of laser light L" being omitted) with respect to the collimator lenses 114 corresponding to the colors. The first plane mirrors 118Y, 118M, 118C and 118K each cause parallel light transmitted through the collimator lens 114 to be reflected in a direction substantially orthogonal to the direction in which the parallel light is made incident. Incidentally, the light sources 124 corresponding to the colors are provided at intervals in the direction indicated by arrow X, so that the laser light LY, LM, LC and LK is adapted so as not to interfere with one another.

Further, one cylindrical lens 120 is provided further at the downstream side of the optical path than the first plane mirror 118 and causes the laser light L to be converged in the slow scan direction. Moreover, a second plane mirror 122 is provided between the cylindrical lens 120 and the polygon mirror 126 and causes the laser light L transmitted through the cylindrical lens 120 to be reflected toward the polygon mirror 126. Then, the laser light LY, LM, LC and LK guided by the second the second plane mirror 122 to the polygon mirror 126 are made incident obliquely on the polygon mirror 126 driven to rotate, and are scanned by the polygon mirror 126.

As shown in FIG. 3, a first fθ lens 132 and a second fθ lens 134, on which four laser light rays L reflected by the reflecting surface 126A of the polygon mirror 126 are made incident and which causes the scanning speeds of the laser light rays L having been subject to fast scan on the photoreceptor 34 to be made constant, are provided further at the downstream side of the optical path than the polygon mirror 126. Then, a third plane mirror 136 is provided further at the downstream side of the optical path than the second fθ lens 134 and causes the four laser light rays LY, LM, LC and LK to be reflected in a direction substantially orthogonal to a direction in which these laser light rays are made incident (in the upward direction of FIG. 3).

A fourth plane mirror 138 and a fifth plane mirror 140 are provided further at the downstream side of the optical path than the third plane mirror 136. The fourth plane mirror 138 reflects two laser light rays LY, LM in a direction substantially orthogonal with respect to a direction in which these laser light rays are made incident, and the fifth plane mirror 140 reflects two light rays LC, LK in a direction (a direction to the right side of FIG. 3) opposite to a direction in which the laser light rays LY, LM are reflected by the fourth plane mirror 138 (a direction to the left side of FIG. 3).

A sixth plane mirror 142 and a cylindrical mirror 148Y made from glass are provided further at the downstream side of the optical path than the fourth plane mirror 138. The sixth plane mirror 142 reflects and folds up the laser light LM, and the cylindrical mirror 148Y reflects the laser light LY reflected by the fourth plane mirror 138 toward the photoreceptor 34Y and causes the laser light LY to form an image on the photoreceptor 34Y. Further, a cylindrical mirror 148 M made from glass is provided further at the downstream side of the optical path than the sixth plane mirror 142 and reflects the laser light LM reflected by the sixth plane mirror 142 toward the photoreceptor 34M and causes the laser light LM to form an image on the photoreceptor 34M.

A seventh plane mirror 144 and a cylindrical mirror 148K made from glass are provided further at the downstream side of the optical path than the fifth plane mirror 140. The seventh plane mirror 144 reflects and folds up the laser light LC, and the cylindrical mirror 148K reflects the laser light LC reflected by the fifth plane mirror 140 toward the photoreceptor 34K and causes the laser light LK to form an image on the photoreceptor 34K. Further, a cylindrical mirror 148C made from glass is provided further at the downstream side of the optical path than the seventh plane mirror 144. The cylindrical mirror 148C reflects the laser light LC reflected by the seventh plane mirror 144 toward the photoreceptor 34C, and causes the laser light LC to form an image on the photoreceptor 34C.

In this manner, in an optical system 146, the laser light L transmitted through the collimator lens 114 (see FIG. 4) is guided to the photoreceptor 34 and an electrostatic latent image is formed on the surface of the photoreceptor 34. This optical system 146 includes the first plane mirror 118, the cylindrical lens 120, the second plane mirror 122, the polygon mirror 126, the first fθ lens 132, the second fθ lens 134, the third plane mirror 136, the fourth plane mirror 138, the fifth plane mirror 140, the sixth plane mirror 142, the seventh plane mirror 144, and the cylindrical mirror 148.

A part of the laser light LK emitted from the light source 124K (see FIG. 4) is used as synchronous light LS. The synchronous light LS is reflected by the fifth plane mirror 140, and thereafter, further reflected by a mirror 150 toward a light detecting sensor 152 disposed outside an image region. Further, a condenser lens 154 (see FIG. 4) is provided between the light detecting sensor 152 and the mirror 150 and concentrates the synchronous light LS reflected by the mirror 150 in the light detecting sensor 152. Then, on the basis of the timing of detecting the synchronous light LS concentrated in the light detecting sensor 152, the control portion 41 (see FIG. 1) controls the timing of writing an image on the photoreceptor 34.

Next, a mounting structure 170 of the light source unit 130 in the case body 40A is described.

Figure 5:
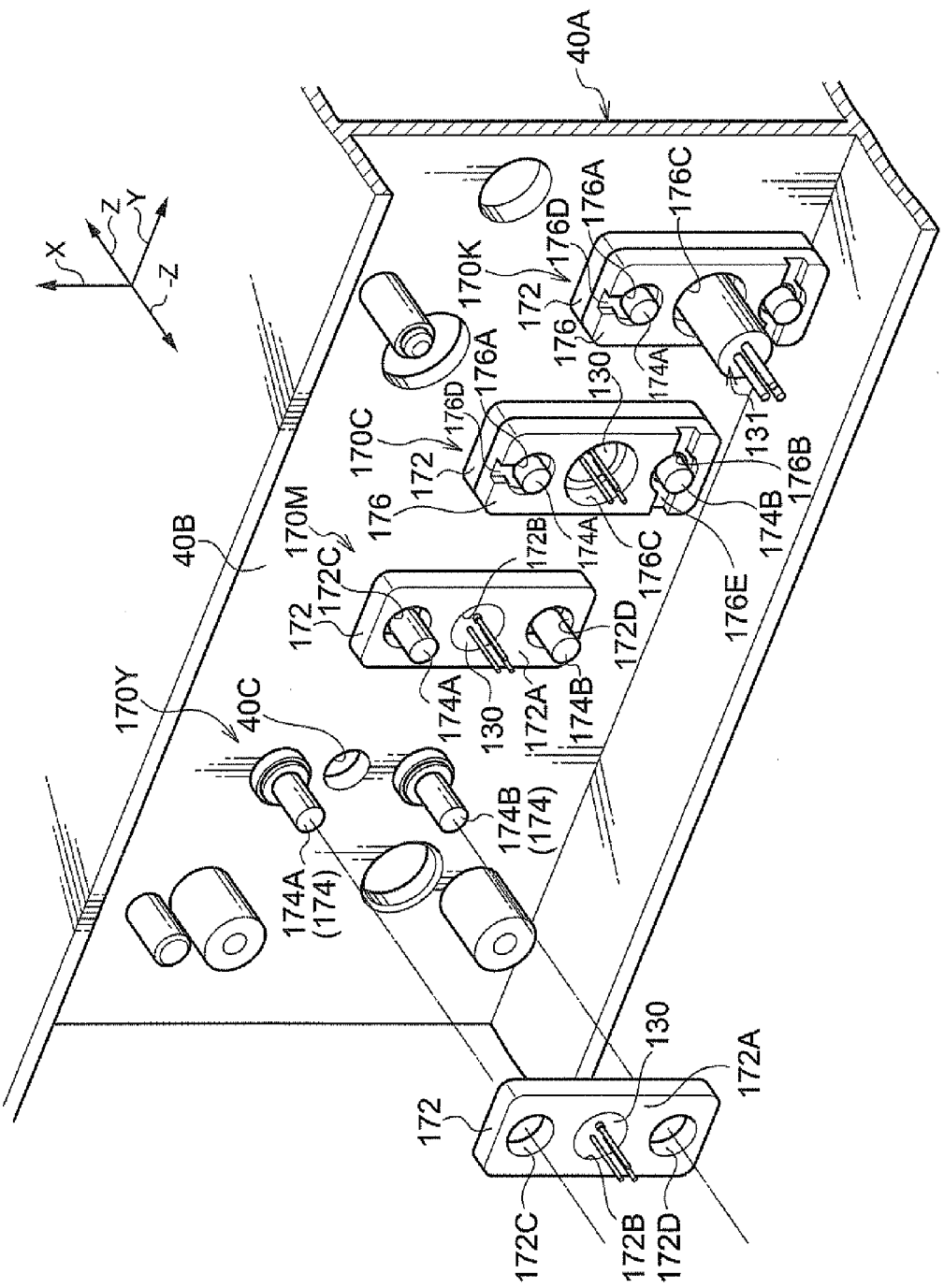
FIG. 5 is a perspective view showing a mounting structure of a light source unit according to a first exemplary embodiment of the invention.

FIG. 5 shows mounting structures 170Y, 170M, 170C and 170K of the light source unit 130 in the case body 40A. In FIG. 5, all components are shown only for the mounting structure 170K, and some components are shown in each of the mounting structures 170Y, 170M and 170C and remaining components are omitted. It should be noted that the mounting structures 170Y, 170M, 170C and 170K have the same configuration, and therefore, descriptions of Y, M, C and K of each component are omitted. Further, the order of the mounting structures 170Y, 170M, 170C and 170K represents the mounting process of the mounting structure 170.

Figure 8:
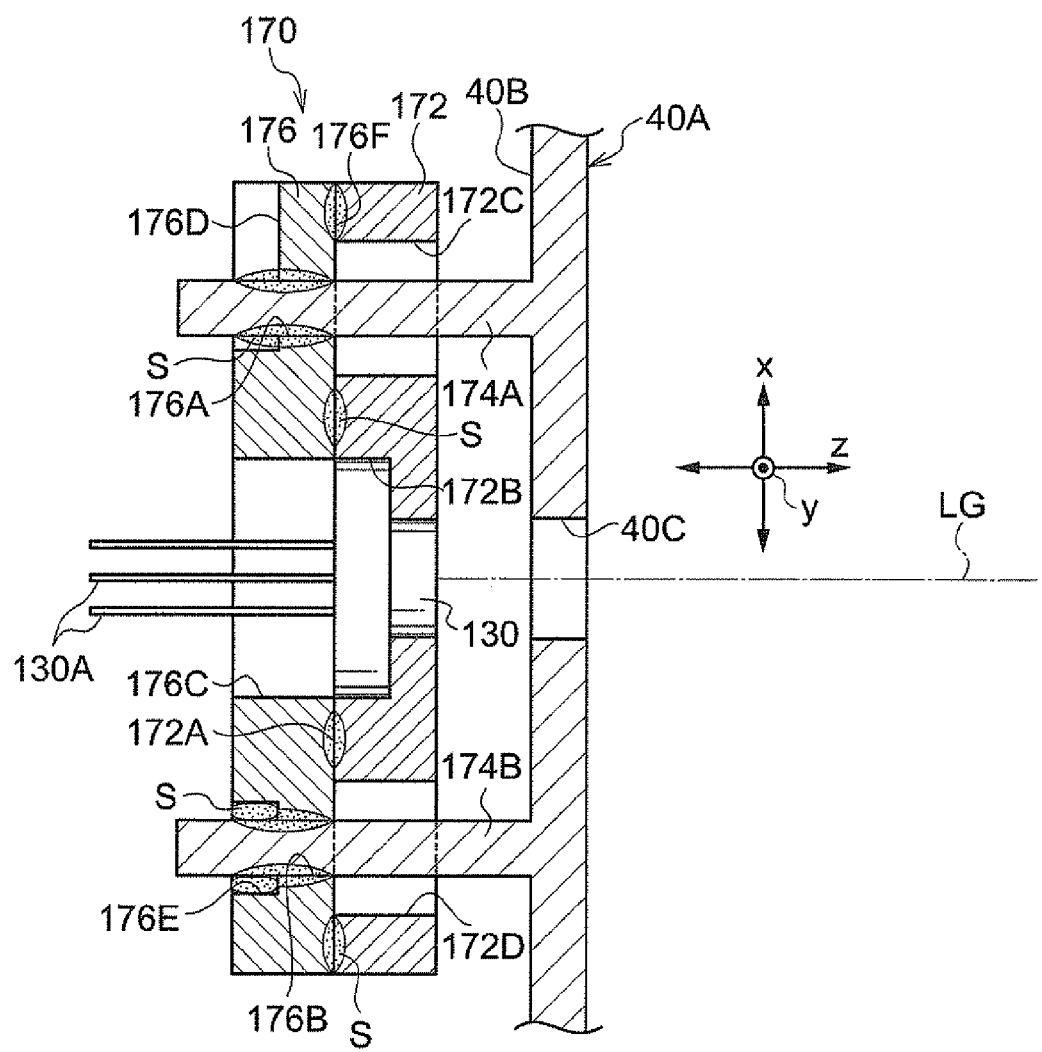
FIG. 8 is a cross sectional view showing a mounting structure of a light source unit to a case body according to a first exemplary embodiment of the invention.

As shown in FIG. 5 and FIG. 8, the mounting structure 170 includes a holding member 172 which holds the light source unit 130 and of which position is adjusted in an X-Y plane that is substantially orthogonal to the optical axis LG of the light source unit 130, a shaft portion 174 projecting from the outer side surface (a side wall 40B) of the case body 40A in the direction along the optical axis LG of the light source unit 130 (in the direction indicated by arrow-Z, that is, the direction opposite to that of arrow Z), and a fixing member 176 guided by the shaft portion 174 in the direction indicated by arrow Z. The fixing member 176 is adhered to a surface 172A of the holding member 172 disposed to face in the direction indicated by arrow Z by means of a UV cured resin S which is cured by curing means utilizing ultraviolet radiation, and is fixed to the shaft portion 174 by means of the UV cured resin S.

The shaft portion 174 is formed by, in the side wall 40B of the case body 40A, circular column-shaped shaft portions 174A and 174B which are disposed at intervals in the direction indicated by arrow X and project in the direction indicated by arrow-Z. Further, a through hole 40C is formed between the shaft portion 174A and the shaft portion 174B in the side wall 4013 into such a size as to impede progression of laser light emitted from the light source unit 130.

The holding member 172 is made of a rectangular plate material, and a through hole 172B of which inside diameter is approximately equal to the outside diameter of the light source unit 130 is formed at the central portion of the holding member 172. Due to the light source unit 130 being made to adhere to the through hole 172B by being press-fit in or fit into the through hole, the light source unit 130 is held by the holding member 172. Further, hole inner walls 172C, 172D of through holes, which are an example of a second circular hole portion are formed at both sides of the through hole 172E in the holding member 172. The inside diameter of the hole inner walls 172C, 172D of the through holes is larger than the outside diameter of the shaft portions 174A, 174B, so that the shaft portion 174A or the shaft portion 174E can be inserted to pass through and the inside diameter of the hole inner walls is sized so as to allow adjustment of the position of the holding member 172 in an X-Y plane substantially orthogonal to the optical axis LG (see FIG. 7). In FIG. 5, the holding member 172 is held by being retained using a position adjustment jig (not shown).

A fixing member 176 is, for example, made of a rectangular plate material formed by a resin through which ultraviolet radiation is transmitted. A contact portion of the fixing member 176 coming into contact with the holding member 172 in a state in which fixing member 176 is externally fit in the shaft portions 174A, 174E is provided, and hole inner walls 176A, 17613 of through holes, which are an example of a first hole portion, are provided at a space therebetween. The inside diameter of the hole inner walls 176A, 176B of the through holes is approximately equal to the outside diameter of the shaft portions 174A, 174B. In the state in which the shaft portions 174A, 174B are inserted and comes into contact with the hole inner walls 176A, 176B of the through holes, the fixing member 176 is regulated only in the direction indicated by arrow Z such that rotation of the fixing member 176 around two axes (X-axis, Y-axis) that are substantially orthogonal to the optical axis LG is limited within an allowable range.

Further, the fixing member 176 includes a through hole 176C formed between the hole inner wall 176A of the through hole and the hole inner wall 176B of the through hole. The through hole 176C is used to adjust the light source unit 130 within the X-Y plane. The inside diameter of the through hole 176C is formed into such a size as to allow a plug 131 (see FIG. 5) connected to terminals 130A (see FIG. 8) of the light source unit 130 and supplying power to the light source unit 130. Moreover, the fixing member 176 includes concave portions 176D, 176E which are used to hold a UV cured resin S in each of peripheral edges of the hole inner walls 176A, 176B of the through holes. The through holes are each formed as a stepped hole.

Figure 6:
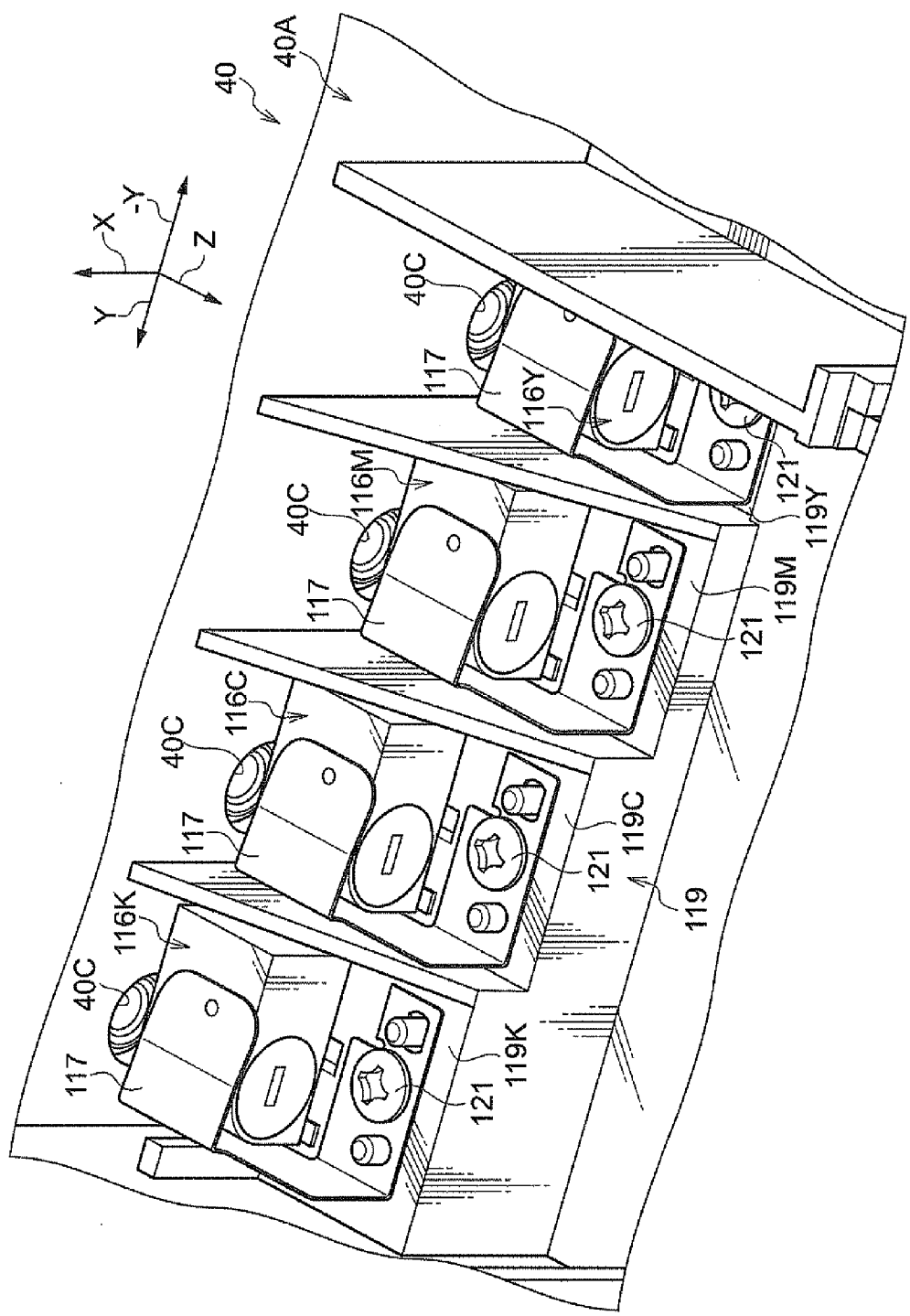
FIG. 6 is a perspective view showing a state in which a lens-barrel member that encloses a collimator lens according to a first exemplary embodiment of the invention is mounted to a case body of an exposure unit.

As shown in FIG. 6, step-wise mounting portions 119Y, 119M, 119C and 119K each for mounting the collimator lens 114 (see FIG. 7) in accordance with each of the light source unit 130 are provided within the case body 40A. Then, in each of the mounting portions 119Y, 119M, 119C and 119K, the lens-barrel member 116 (respectively, labeled 116Y, 116M, 116C and 116K) which holds the collimator lens 114 is fixed at a predetermined position by a plate spring member 117 fixed to each mounting portion 119 by means of a screw 121.

Figure 7:
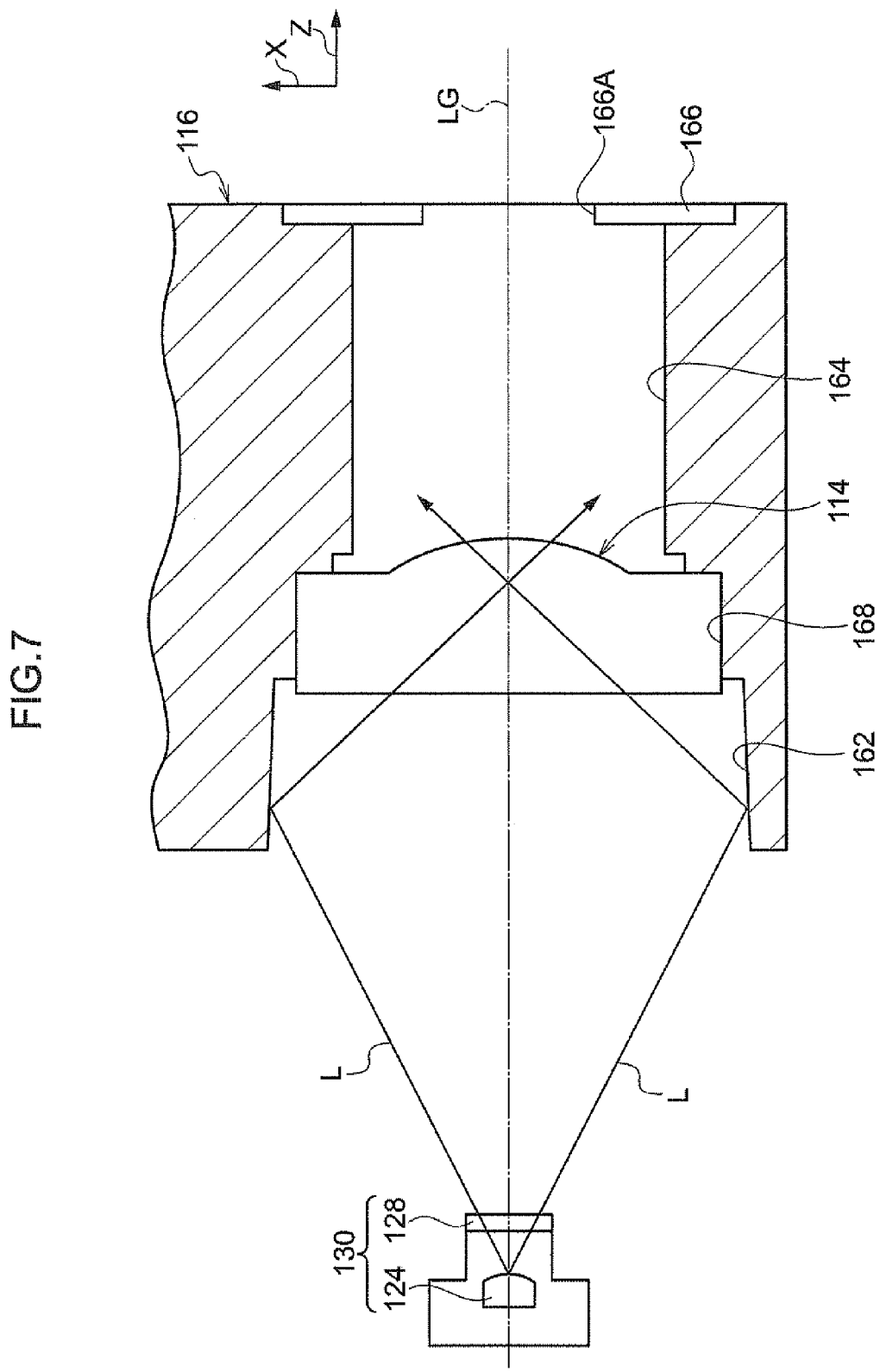
FIG. 7 is a cross sectional view of a lens-barrel member according to a first exemplary embodiment of the invention.

As shown in FIG. 7, the lens-barrel member 116 is formed of a resin material and into a rectangular parallelepiped body. The lens-barrel member 116 includes a light-incident-side tube portion 162 in which laser light L emitted from the light source unit 130 (see FIG. 8) is made incident, a light-emission-side tube portion 164 through which laser light L passing through the light-incident-side tube portion 162 and transmitted through the collimator lens 114 passes, and a plate member 166 in which a slit hole 166A limiting the laser light L passing through the light-emission-side tube portion 164 and causing the laser light to exit outside (to the first plane mirror 118) is formed. The inside diameter of the inner peripheral surface of the light-incident-side tube portion 162 is made larger than that of the light-emission-side tube portion 164. Further, a tube portion 168 is provided between the light-emission-side tube portion 164 and the light-incident-side tube portion 162 in such a manner that the outer peripheral portion of the collimator lens 114 is fit in the tube portion 168.

Next, the operation of the first exemplary embodiment of the invention is described. It should be noted that the mounting structures 170Y, 170M, 170C and 170K have the same structure, and therefore, they are collectively described as the mounting structure 170.

As shown in FIG. 8, first, the light source unit 130 is fixed into the through hole 172B of the holding member 172 by press-fitting or fit-in adhesive. Subsequently, the terminals 130A of the light source unit 130 are made to pass through the through hole 176C of the fixing member 176, and the surface 172A of the holding member 172 and a surface 176F of the fixing member 176 at the side at which the concave portions 176D, 176E are not formed are made to come into contact with each other. In this case, a UV cured resin S is applied to a portion between the surface 172A and the surface 176F, and also to the hole inner walls 176A, 176B of the through holes of the fixing member 176 using a dispenser (not shown). In the above-described state, the hole inner wall 172C of the through hole and the hole inner wall 176A of the through hole are fit around the shaft portion 174A of the case body 40A from an outside, and the hole inner wall 172D of the through hole and the hole inner wall 176A of the through hole are fit around the shaft portion 174B from an outside. Here, even if any one of fitting of the hole inner wall 172C around the shaft portion 174 and fitting of the hole inner wall 176A around the shaft portion 17413 is unsuccessful, the other one of the hole inner walls 172C, 172D of the through holes is caught by any one of the shaft portions 174A, 174B, so as to prevent dropping of the holding member 172. Then, the UV cured resin S is also applied to the concave portions 176D, 176E.

Subsequently, the plug 131 (see FIG. 5) is connected to the terminals 130A of the light source unit 130. Incidentally, illustration of wiring of the plug 131 is omitted. Then, the plug 131 is supported at an unillustrated X-Y stage so as to be movable both in the direction indicated by arrow X and in the direction indicated by arrow Y. Further, power is supplied from a power source unit (not shown) to the light source unit 130, so that laser light is emitted from the light source unit 130. Then, the position of the light source unit 130 within the X-Y plane is adjusted while the position of the laser light is being confirmed by a monitor (not shown) disposed at the downstream side of the optical path.

In this case, the light source unit 130 and the holding member 172 are provided in an integrated manner, and therefore, when the plug 131 is moved at the X-Y stage, the holding member 172 moves similarly while being guided along the fixing member 176. Further, the hole inner walls 172C, 172D of the through holes in the holding member 172 are each formed into a size of including allowance for adjustment, and therefore, the hole inner walls 172C, 172D do not come into contact with the shaft portions 174A, 174B, respectively.

Here, the shaft portions 174A, 17413, and the hole inner walls 176A, 176B of the through holes in the fixing member 176 are respectively brought into contact with each other. Therefore, rotation of the fixing member 176 around two axes (X-axis, Y-axis) that are substantially orthogonal to the direction along the optical axis LG is limited in an allowable range. As a result, even if the X-Y position of the light source unit 130 is adjusted, tilting of the fixing member 176 is prevented, that is, movement of the fixing member 176 is regulated only in the direction indicated by arrow Z, and tilting of the optical axis LG of the light source unit 130 is prevented.

Further, when the light source unit 130 is moved in the direction along the optical axis LG for focus adjustment (for adjustment in the direction indicated by arrow Z), the shaft portions 174A, 174B, and the hole inner walls 176A, 176B of the through holes in the fixing member 176 are respectively made to contact with each other. Therefore, the holding member 172 and the light source unit 130 are guided along the direction of the optical axis LG without being displaced within the X-Y plane. In this manner, after adjustment of the position of the light source unit 130 in the directions indicated by arrows X, Y an Z is completed, ultraviolet radiation is applied toward the surface of the fixing member 176 in which the concave portions 176D, 176E are formed. In this case, the ultraviolet radiation is transmitted through the fixing member 176, and therefore, the UV cured resin S applied to a portion between the surface 176F of the fixing member 176 and the surface 172A of the holding member 172 is cured by the action of ultraviolet radiation. Further, the UV cured resin S applied to other regions is also cured. As a result, the light source unit 130 is fixed to the case body 40A.

Figure 14:
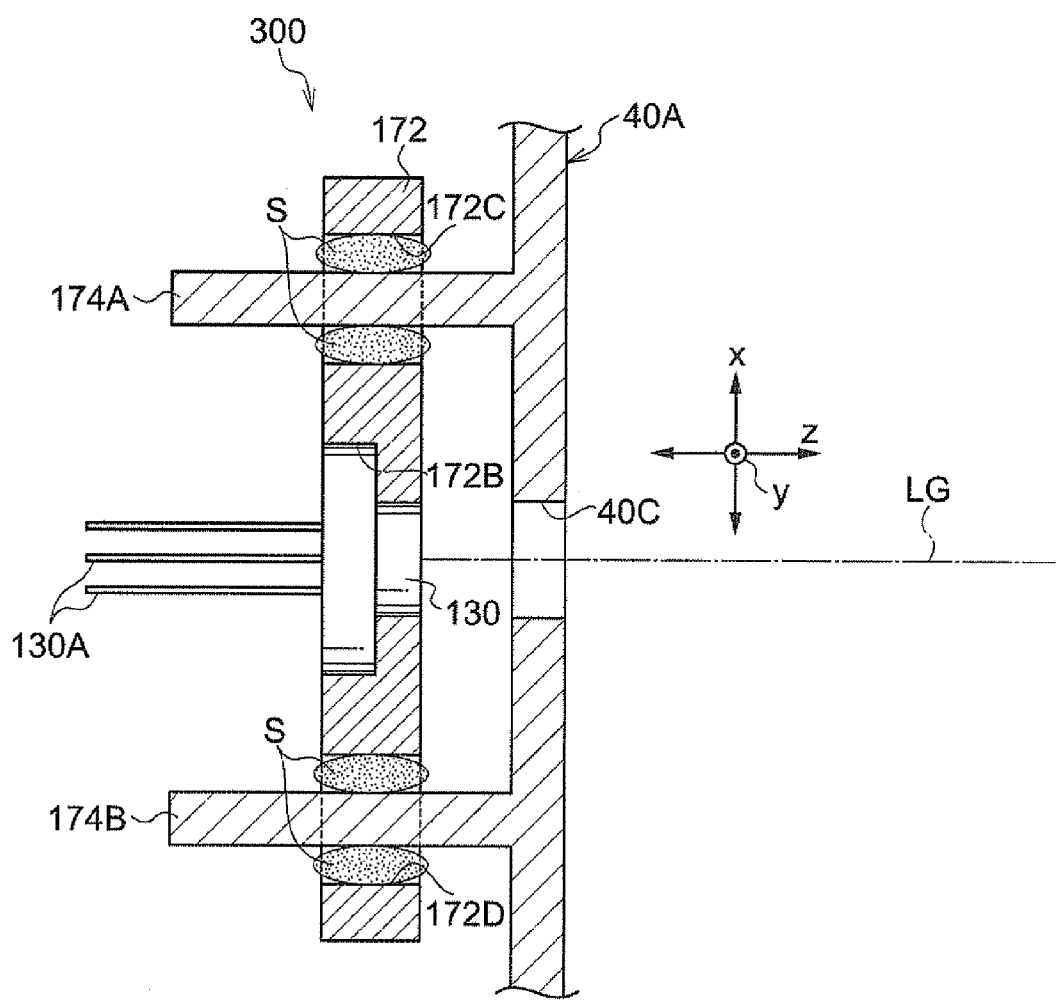
FIG. 14 is a cross sectional view showing a mounting structure of a light source unit to a case body according to a comparative example.

FIG. 14 shows a mounting structure 300 of the light source unit 130, which is a comparative example for comparison to the present exemplary embodiment. It should be noted that the basically same members and parts as those of the present exemplary embodiment are denoted by the same reference numerals, and a description thereof is omitted.

As shown in FIG. 14, the mounting structure 300 of the related art does not include the fixing member 176 shown in the mounting structure 170 (see FIG. 8) of the present exemplary embodiment, and has a structure in which the light source unit 130 is held only by the holding member 172 in the shaft portion 174. Here, in the mounting structure 300 of the comparative example, the UV cured resin S is applied to portions between each of the shaft portions 174A, 17413, and each the hole inner walls 172C, 172D of the through holes, and thereafter, position of the light source unit 130 within the X-Y plane, and the focal point thereof in the direction indicated by arrow Z are adjusted, and the UV cured resin S is irradiated with ultraviolet radiation and cured. However, in the mounting structure 300 of the comparative example, a clearance between the shaft portion 174 and the hole inner wall 172C of the through hole, and a clearance between the shaft portion 174B and the hole inner wall 172D of the through hole each become wide, and therefore, rotation of the holding member 172 around two axes (X-axis, Y-axis) that are substantially orthogonal to the direction along the optical axis LG is outside the allowable range, whereby the optical axis LG of the light source unit 130 is apt to be tilted. As a result, it is necessary that the operation of position adjustment is repeatedly carried out, and such adjustments become difficult.

To the contrary, in the mounting structure 170 of the light source unit 130 of the present exemplary embodiment, even if the X-Y position of the light source unit 130 is adjusted, tilting of the fixing member 176 is prevented, that is, the position of the light source unit 130 is regulated only in the direction indicated by arrow Z, and tilting of the optical axis LG of the light source unit 130 is prevented. Therefore, no repeated operation of the position adjustment is required and the position adjustment becomes simple.

Next, respective examples of a mounting structure of a mounted component, a light scanning device, and an image forming apparatus according to a second exemplary embodiment of the invention are described. It should be noted that the basically same parts as those of the first embodiment are denoted by the same reference numerals, and a description thereof is omitted.

Figure 9:
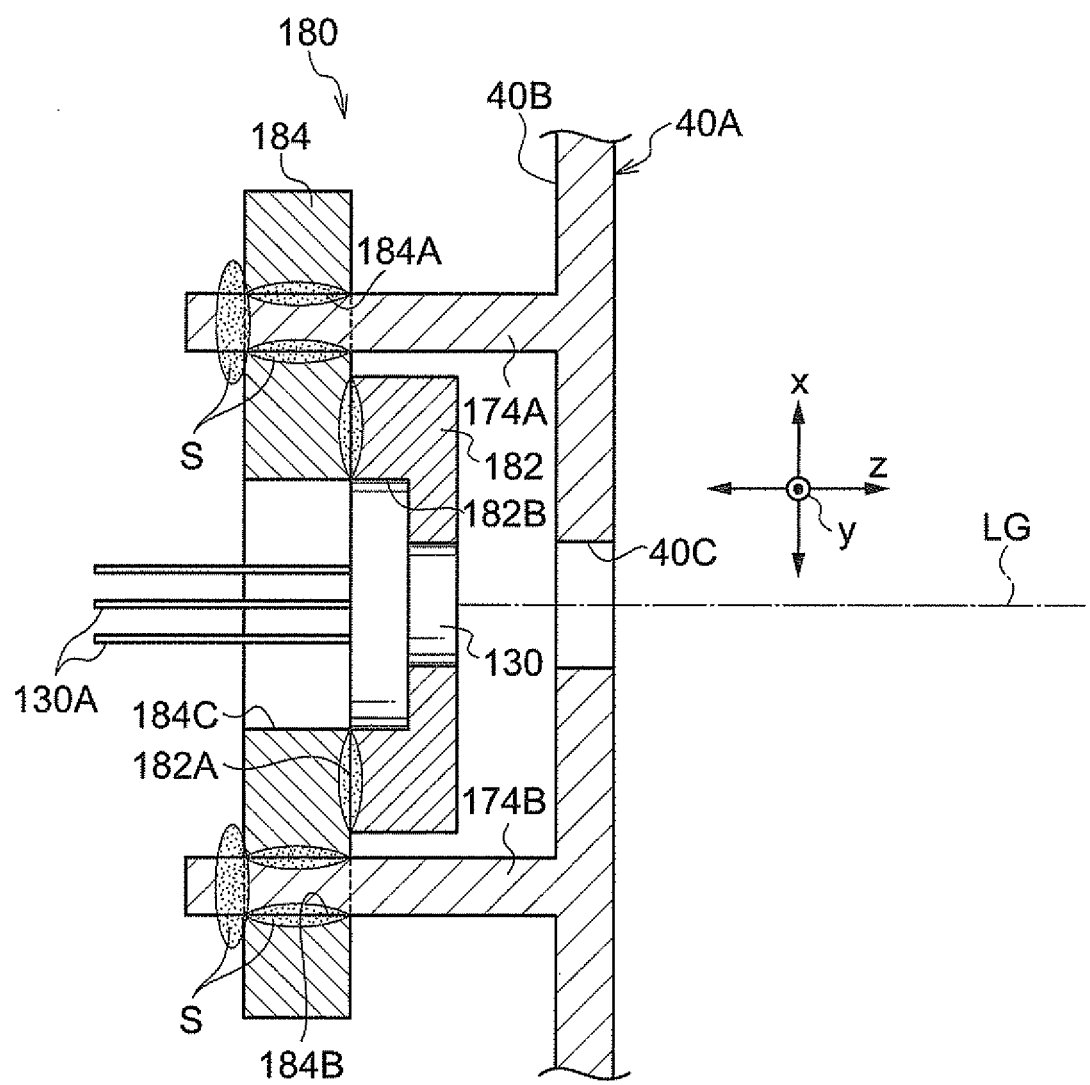
FIG. 9 is a cross sectional view showing a mounting structure of a light source unit to a case body according to a second exemplary embodiment of the invention.

FIG. 9 shows a mounting structure 180 of the second exemplary embodiment. The mounting structure 180 has the same structure as that of the first exemplary embodiment except that in the mounting structure 170 (see FIG. 8) of the image forming apparatus 10 according to the first exemplary embodiment, a holding member 182 is provided in place of the holding member 172, and a fixing member 184 is provided in place of the fixing member 176.

The holding member 182 is made of a rectangular plate material, and a through hole 182B of which inside diameter is substantially equal to the outside diameter of the light source unit 130 is formed at the central portion of the holding member 182. Due to the light source unit 130 being made to adhere to the through hole 182B by being press-fit in or fit into the through hole 182B, the light source unit 130 is held by the holding member 182. Further, no other through hole is formed at both sides of the through hole 182B in the holding member 182, and the holding member 182 is formed so as to be accommodated between the shaft portion 174A and the shaft portion 174B. Incidentally, in FIG. 9, the holding member 182 is held by being caught by means of an unillustrated position adjustment jig.

The fixing member 184 is a rectangular plate material formed by a resin through which ultraviolet radiation is transmitted. A contact portion of the fixing member 184 coming into contact with the holding member 182 in a state in which fixing member 184 is externally fit in the shaft portions 174A, 174B is provided, and hole inner walls 184A, 184B of through holes, which are an example of a first hole portion, are provided at a space therebetween. The inside diameter of the hole inner walls 184A, 184B of the through holes is substantially equal to the outside diameter of the shaft portions 174A, 174B, and in the state in which the shaft portions 174A, 174B are inserted and are made to come into contact with the hole inner walls 184A, 184B of the through hole, respectively, movement of the fixing member 184 is regulated only in the direction indicated by arrow Z such that rotation of the fixing member 184 around two axes (X-axis, Y-axis) that are substantially orthogonal to the optical axis LG is limited within an allowable range.

Further, a through hole 184C is formed in the fixing member 184 between the hole inner wall 184A of the through hole and the hole inner wall 184B of the through hole. The through hole 184C is used to adjust the light source unit 130 within the X-Y plane. The inside diameter of the through hole 184C is set such that the plug 131 (see FIG. 5) can be inserted to pass through the through hole.

Next, the operation of the second exemplary embodiment of the invention is described.

As shown in FIG. 9, first, the light source unit 130 is fixed to the through hole 182B of the holding member 182 by means of press-fitting or fit-in adhesive. Subsequently, the terminals 130A of the light source unit 130 are made to pass through the through hole 184C of the fixing member 184 and a surface 182A of the holding member 182 and the fixing member 184 are made to contact with each other. In this case, UV cured resin S is applied, using a dispenser (not shown), to a portion between the holding member 182 and the fixing member 184, and also to the hole inner walls 184A, 184B of the through holes in the fixing member 184. In the above-described state, the hole inner wall 184A of the through hole is fit in the shaft portion 174A of the case body 40A from an outside, and the hole inner wall 184B of the through hole is fit in the shaft portion 17413 from an outside.

Subsequently, the plug 131 (see FIG. 5) is connected to the terminals 130A of the light source unit 130 and the position of the light source unit 130 within the X-Y plane is adjusted in the same procedure as that of the first exemplary embodiment. In this case, the light source unit 130 and the holding member 182 are provided in an integrated manner, and therefore, when the plug 131 is moved at the X-Y stage, the holding member 182 moves similarly while being guided along the fixing member 184. Further, the holding member 182 does not come into contact with the shaft portions 174A, 174B.

Here, the shaft portions 174A, 174B and the hole inner walls 184A, 184B of the through holes are respectively brought into contact with each other. Therefore, rotation of the fixing member 184 around two axes (X-axis, Y-axis) that are substantially orthogonal to the direction along the optical axis LG is limited within an allowable range. As a result, even if the X-Y position of the light source unit 130 is adjusted, tilting of the fixing member 184 is prevented, and tilting of the optical axis LG of the light source unit 130 is restrained.

Further, when the light source unit 130 is moved in the direction along the optical axis LG, the shaft portions 174A, 174B and the hole inner walls 184A, 184B of the through holes are respectively brought into contact with each other. Therefore, the holding member 182 and the light source unit 130 are guided along the direction along the optical axis LG without being displaced within the X-Y plane. In this manner, after adjustment the position of the light source unit 130 in the directions indicated by arrows X, Y and Z is completed, the fixing member 184 is fixed by ultraviolet radiation.

Next, respective examples of a mounting structure of a mounted component, a light scanning device, and an image forming apparatus according to a third exemplary embodiment of the invention are described. It should be noted that the basically same parts as those of the first and second exemplary embodiments are denoted by the same reference numerals, and a description thereof is omitted.

Figure 10:
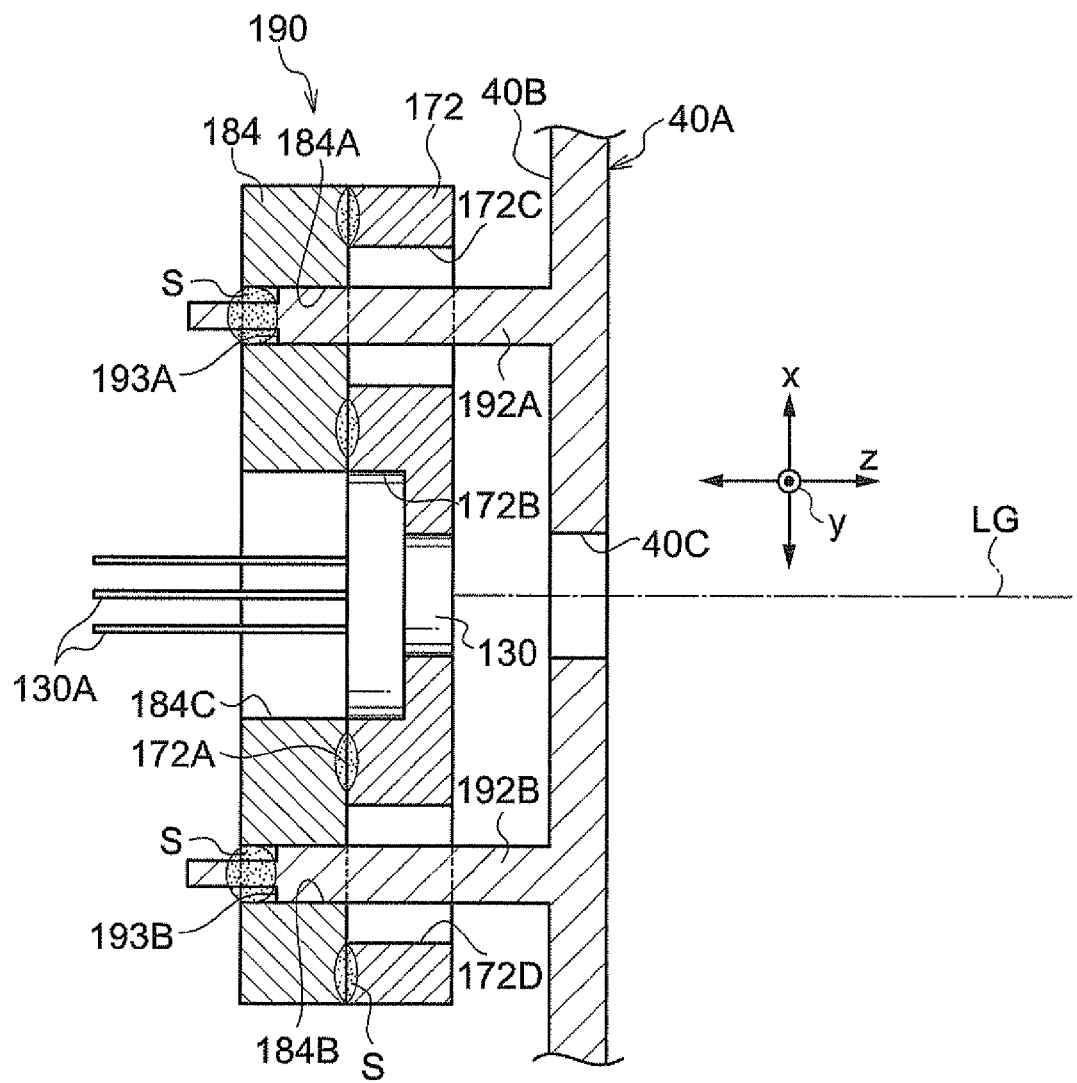
FIG. 10 is a cross sectional view showing a mounting structure of a light source unit to a case body according to a third exemplary embodiment of the invention.

FIG. 10 shows a mounting structure 190 of the third exemplary embodiment. The mounting structure 190 includes a combination of the holding member 172 of the first exemplary embodiment and the fixing member 184 of the second exemplary embodiment, and further, includes shaft portions 192A, 192B, whose end portions disposed opposite to the case body 40A are reduced in the diameter thereof, in place of the shaft portions 174A, 174B of the first exemplary embodiment. The other component parts are similar to those of the first exemplary embodiment.

Next, the operation of the third exemplary embodiment of the invention is described.

As shown in FIG. 10, when the hole inner walls 184A, 184B of the through holes are respectively fit around the shaft portions 192A, 192B from an outside, the end portions of the shaft portions 192A, 192B are reduced in the diameter thereof, whereby fitting of the hole inner walls 184A, 184B of the through holes from the outside is facilitated. Further, clearances between portions of the shaft portions 192A, 192B whose diameters are each reduced, and the hole inner walls 184A, 184B of the through holes are formed as concave portions in which UV cured resin S is collected, and therefore, flowing of the adhesive to the fixing member 184 is restrained, and a good appearance after curing is achieved.

Next, respective examples of a mounting structure of a mounted component, a light scanning device, and an image forming apparatus according to a fourth exemplary embodiment of the invention are described. It should be noted that the basically same parts as those of the first, second and third exemplary embodiments as described above are denoted by the same reference numerals, and a description thereof will be omitted.

Figure 11:
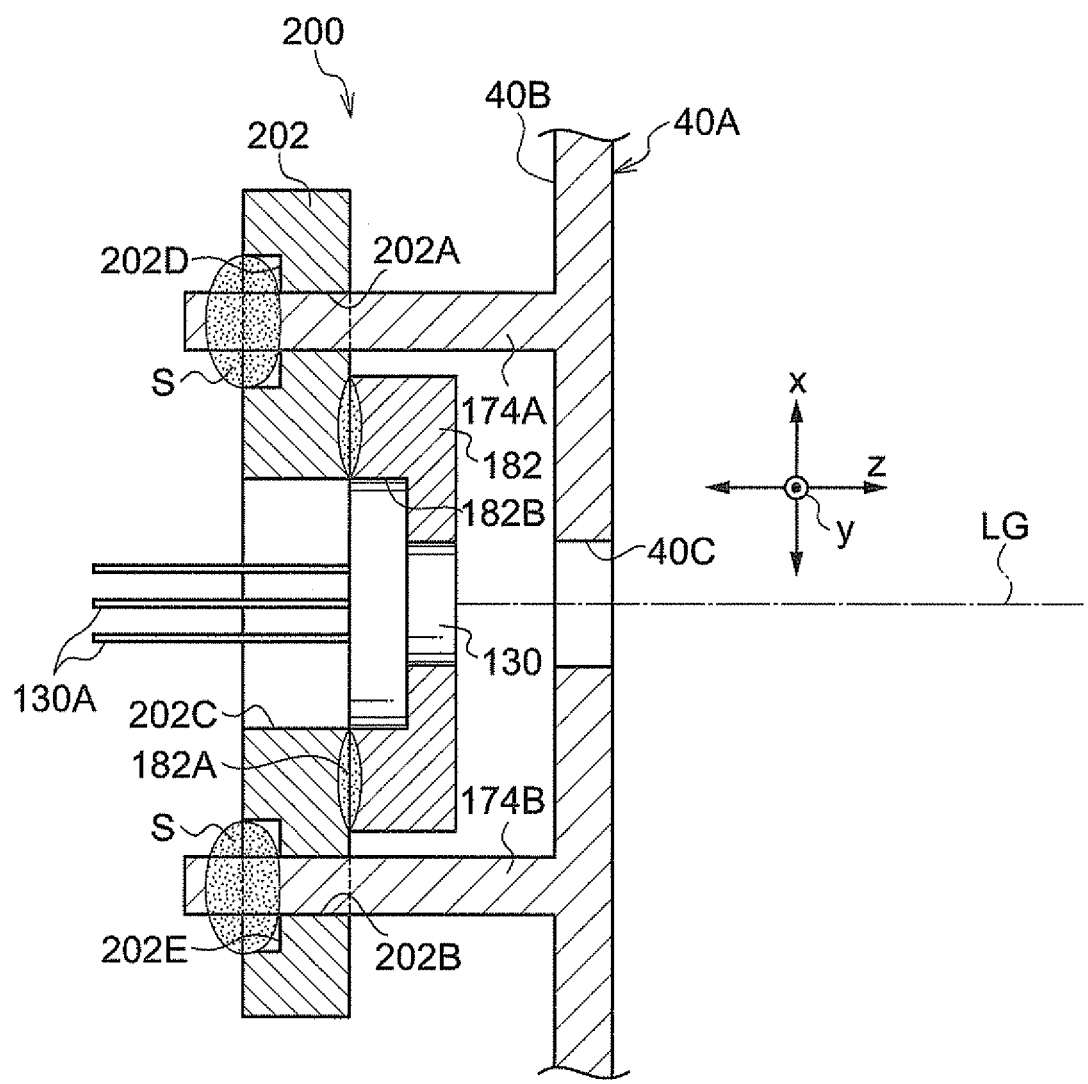
FIG. 11 is a cross sectional view showing a mounting structure of a light source unit to a case body according to a fourth exemplary embodiment of the invention.

FIG. 11 shows a mounting structure 200 of the fourth exemplary embodiment. The mounting structure 200 has the same structure as that of the first exemplary embodiment except that a holding member 182 is provided in place of the holding member 172 and a fixing member 202 is provided in place of the fixing member 176 in the mounting structure 170 (see FIG. 8) of the image forming apparatus 10 of the first exemplary embodiment.

The fixing member 202 is, for example, made of a rectangular plate material formed by a resin through which ultraviolet radiation is transmitted. A contact portion of the fixing member 202 coming into contact with the holding member 182 in a state in which fixing member 202 is externally fit in the shaft portions 174A, 174B is provided, and hole inner walls 202A, 202B of through holes, which are an example of a first hole portion, are provided at a space therebetween. The inside diameter of the hole inner walls 202A, 202B of the through holes is substantially equal to the outside diameter of the shaft portions 174A, 174B, and in the state in which the shaft portions 174A, 174B are inserted and come into contact with the hole inner walls 202A, 202B of the through holes, movement of the fixing member 202 is regulated only in the direction indicated by arrow Z, such that rotation of the fixing member 202 around two axes (X-axis, Y-axis) that are substantially orthogonal to the optical axis LG is limited in an allowable range.

Further, a through hole 202C is formed in the fixing member 202 between the hole inner wall 202A of the through hole and the hole inner wall 202B of the through hole. The through hole 202C is used to adjust the light source unit 130 within the X-Y plane. The inside diameter of the through hole 202C is set so that the plug 131 (see FIG. 5) can be inserted therein. In addition, concave portions 202D, 202E used for collecting UV cured resin S therein are formed in peripheral edge portions of the hole inner walls 202A, 20213 of the through holes, respectively.

Next, the operation of the fourth exemplary embodiment of the invention is described.

As shown in FIG. 11, first, the light source unit 130 is fixed to the holding member 182 by means of press-fitting or fit-in adhesive. Subsequently, the terminals 130A of the light source unit 130 are made to pass through the through hole 202C of the fixing member 202, and a surface 182A of the holding member 182 and the fixing member 202 are made to come into contact with each other. In this case, UV cured resin S is applied to a portion between the holding member 182 and the fixing member 202, and also to the hole inner walls 202A, 202B of the through holes in the fixing member 202. In the above-described state, the hole inner walls 202A, 202B are respectively fit around the shaft portions 174A, 174B of the case body 40A from the outside.

Subsequently, the plug 131 (see FIG. 5) is connected to the terminals 130A of the light source unit 130 and the position of the light source unit 130 within the X-Y plane is adjusted in the same procedure as that of the first exemplary embodiment. In this case, the holding member 182 does not come into contact with the shaft portions 174A, 174B.

Here, the shaft portions 174A, 17413 and the hole inner walls 202A, 202B of the through holes are respectively brought into a state of coming into contact with each other, and therefore, rotation of the fixing member 202 around two axes (X-axis, Y-axis) that are substantially orthogonal to the optical axis LG is limited in an allowable range. As a result, even if adjustment of the X-Y position of the light source unit 130 is carried out, the fixing member 202 and the holding member 182 are prevent from tiling, so that tilting of the optical axis LG of the light source unit 130 is prevented.

Further, when the light source unit 130 is moved in the direction along the optical axis LG, the shaft portions 174A, 174B and the hole inner walls 202A, 202B of the through holes are respectively brought into contact with each other. Therefore, the holding member 182 and the light source unit 130 are guided along the optical axis LG without being displace within the X-Y plane. In this manner, after adjustment of the position of the light source unit 130 in the directions indicated by arrows X, Y and Z is completed, the fixing member 202 is fixed by ultraviolet radiation. Here, the UV cured resin S is collected in the concave portions 202D, 202E of the fixing member 202, and therefore, trickling of an adhesive down to the fixing member 202 is prevented, and a good appearance after curing is achieved.

Figure 12:
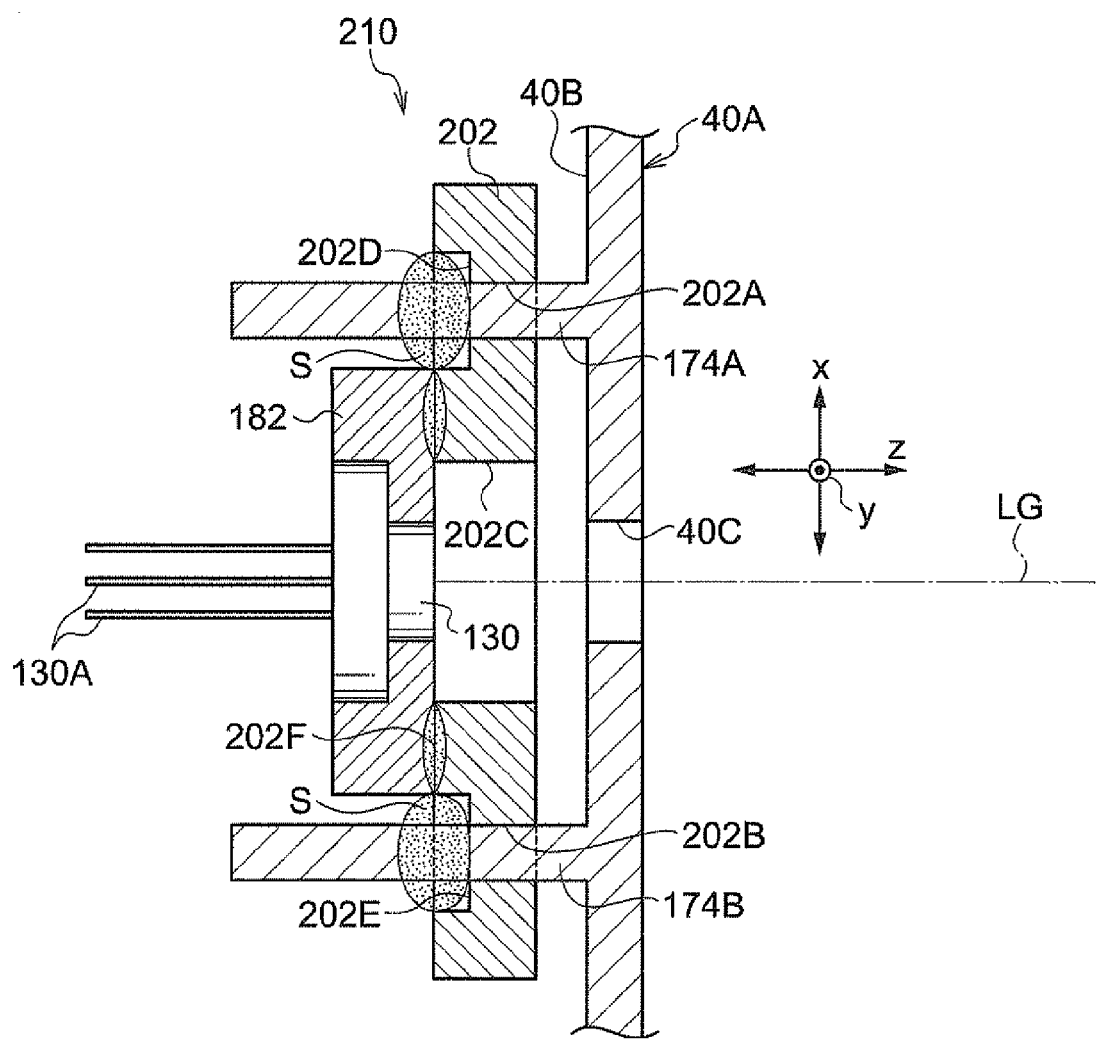
FIG. 12 is a cross sectional view showing a modified example of a mounting structure of a light source unit to a case body according to a fourth exemplary embodiment of the invention.

Incidentally, as shown in FIG. 12, as a modified example of the mounting structure 200, a mounting structure 210 in which the holding member 182 and the fixing member 202 are mounted to the case body 40A in such a manner that the fixing member 202 is disposed at the side close to the case body 40A and the holding member 182 is disposed at the side far away from the case body 40A may also be used. In the mounting structure 210 as well, the holding member 182 is prevented from tilting by the fixing member 202, and tilting of the optical axis LG of the light source unit 130 is restrained.

Next, respective examples of a mounting structure of a mounted component, a light scanning device, and an image forming apparatus according to a fifth exemplary embodiment of the invention are described. It should be noted that the basically same parts as those of the first to fourth exemplary embodiments as described above are denoted by the same reference numerals, and a description thereof is omitted.

Figure 13A:
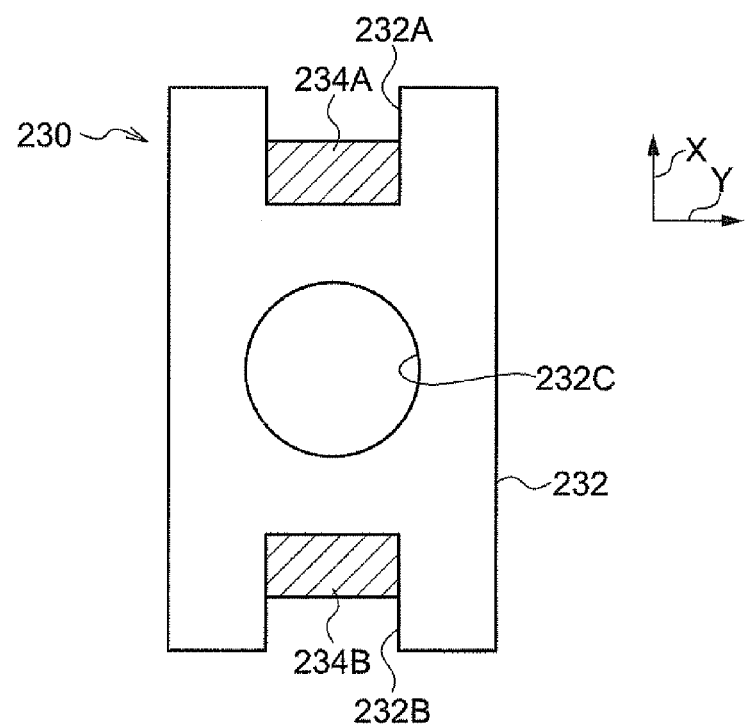
FIGS. 13A and 13B are a front view and a cross sectional view, respectively, of a mounting structure of a light source unit to a case body according to a fifth exemplary embodiment of the invention.
Figure 13B:
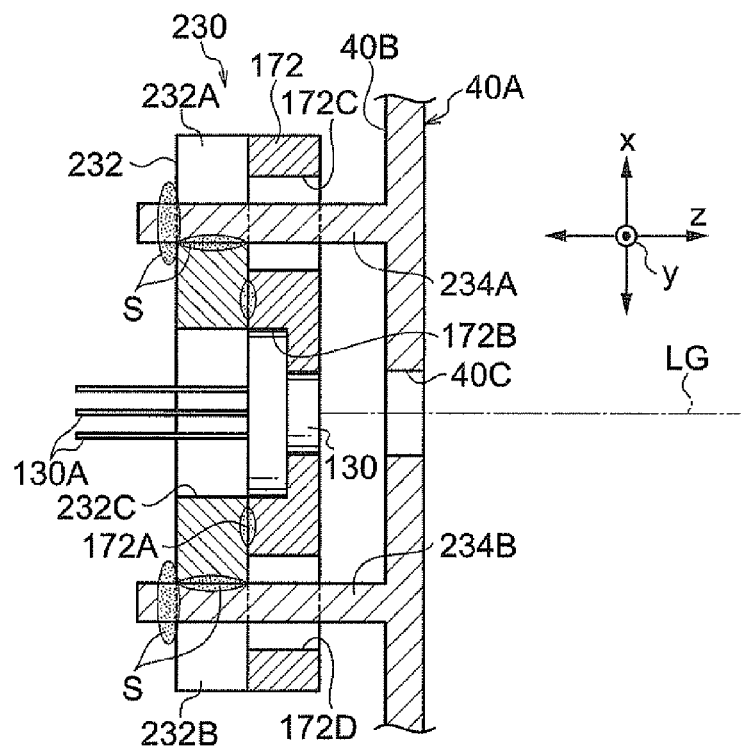

FIGS. 13A and 13B each show a mounting structure 230 according to the fifth exemplary embodiment. The mounting structure 230 is similar to that of the first exemplary embodiment except that in the mounting structure 170 (see FIG. 8) of the image forming apparatus 10 according to the first exemplary embodiment, the holding member 172 is used as it is, and a fixing member 232 is provided in place of the fixing member 176, and further, shaft portions 234A, 23413 each having a rectangular cross section within the X-Y plane are provided in place of the shaft portions 174A, 174B. The shaft portions 234A, 234B are formed in such a manner that these shaft portions can be inserted into and pass through the hole inner walls 172C, 172D of the through holes, respectively, and the light source unit 130 can be adjusted within the X-Y plane.

The fixing member 232 is, for example, made of a rectangular plate material formed by a resin through which ultraviolet radiation is transmitted, and includes concave portions 232A, 23B, which forms an example of a contact portion in which the fixing member 232 is fit around the shaft portions 234A, 234B from the outside, at both end portions thereof in the direction indicated by arrow X when disposed within the X-Y plane. Further, a through hole 232C formed such that the plug 131 (see FIG. 5) can be connected to the terminals 130A within the through hole provided in the fixing member 232 between the concave portions 232A and 232B.

The size of the concave portions 232A, 232B is approximately equal to the outside dimension of the shaft portions 234A, 234B. In the state in which the shaft portions 234A, 234B are inserted in the concave portions and come into contact with the hole inner walls of the concave portions 232A, 232B, respectively, movement of the fixing member 232 is regulated only in the direction indicated by arrow Z such that rotation of the fixing member 232 around two axes (X-axis, Y-axis) that are substantially orthogonal to the optical axis LG is limited in an allowable range.

Next, the operation of the fifth exemplary embodiment of the invention is described.

As shown in FIG. 13B, first, the light source unit 130 is fixed to the holding member 172 by press-fitting or fit-in adhesive. Subsequently, the UV cured resin S is applied by using a dispenser (not shown) to a portion between the holding member 172 and the fixing member 232, and also to the hole inner walls of the concave portions 232A, 232B. In the above-described state, the concave portions 232A, 232B are respectively fit in the shaft portions 234A, 234B from the outside, and the surface 172A of the holding member 172 and the fixing member 232 are caused to come into contact with each other.

Subsequently, the plug 131 (see FIG. 5) is connected to the terminals 130A of the light source unit 130, and adjustment of the position of the light source unit 130 within the X-Y plane is carried out in the same procedure as that of the first exemplary embodiment. In this case, the holding member 172 does not come into contact with the shaft portions 234A, 234B.

Here, the shaft portions 234A, 234B and the concave portions 232A, 232B are respectively brought into contact with each other, and therefore, rotation of the fixing member 232 around two axes (X-axis, Y-axis) that are substantially orthogonal to the optical axis LG is limited to an allowable range. As a result, even if adjustment of the position of the light source unit 130 within the X-Y plane is carried out, the fixing member 232 and the holding member 172 are prevented from tilting, and tilting of the optical axis LG of the light source unit 130 is restrained.

Further, when the light source unit 130 is moved in the direction along the optical axis LG, the shaft portions 234A, 234B and the concave portions 232A, 232B are respectively brought into contact with each other. Therefore, the holding member 172 and the light source unit 130 are guided along the optical axis LG without being displaced within the X-Y plane. In this manner, after adjustment of the position of the light source unit 130 in the directions indicated by arrows X, Y and Z is completed, the fixing member 232 is fixed by ultraviolet radiation.

Incidentally, the present invention is not limited to the above-described exemplary embodiments.

With the side of the light source unit 130 being fixed, each fixing member is provided for the lens-barrel member 116 of the collimator lens 114, whereby tilting of the optical axis LG at the time of position adjustment of the collimator lens 114 may be prevented. Further, three or more shaft portions may be provided. Moreover, a widthwise dimension (plate thickness) within the X-Z plane of each fixing member may not coincide with that of each of the shaft portions.

What is claimed is:

1. A mounting structure for a mounted component, the structure comprising:
    a holding member that holds a mounted component comprising a light source, the position of the holding member being adjusted within a plane that is substantially orthogonal to an optical axis of the light source;
    a shaft portion that projects from a side surface of a case body in which the light source is provided, in a direction along the optical axis of the light source; and
    a fixing member in which a contact portion that contacts the shaft portion is provided, wherein in a state in which the contact portion contacts the shaft portion, rotation of the fixing member around two axes that are substantially orthogonal to the optical axis is limited to an allowable range, and the fixing member is adhered, by a cured resin cured by a curing member, to a surface of the holding member facing toward the fixing member in the direction along the optical axis, and is fixed by the cured resin to the shaft portion.

2. The mounting structure for a mounted component according to claim 1, wherein the contact portion comprises a first hole portion having an inner diameter that limits rotation of the fixing member around two axes that are substantially orthogonal to the optical axis to an allowable range when the first hole portion is in contact with the shaft portion.

3. The mounting structure for a mounted component according to claim 2, wherein the fixing member is formed by a resin through which ultraviolet radiation is transmitted, and the cured resin is a resin cured by being irradiated with ultraviolet radiation.

4. The mounting structure for a mounted component according to claim 2, wherein a second hole portion is formed in the holding member into which the shaft portion is inserted, the inner diameter of the second hole portion being larger than an outer diameter of the shaft portion.

5. The mounting structure for a mounted component according to claim 1, wherein the fixing member is formed by a resin through which ultraviolet radiation is transmitted, and the cured resin is a resin cured by being irradiated with ultraviolet radiation.

6. The mounting structure for a mounted component according to claim 1, wherein a second hole portion is formed in the holding member into which the shaft portion is inserted, the inner diameter of the second hole portion being larger than an outer diameter of the shaft portion.

7. The mounting structure for a mounted component according to claim 1, wherein a concave portion is formed at the surface of the fixing portion surrounding the contact portion, the concave portion being configured to allow the cured resin to be applied therein.

8. The mounting structure for a mounted component according to claim 1, wherein an end portion of the shaft portion in the direction along the optical axis has a reduced diameter such that when the shaft portion is made to contact with the contact portion of the fixing member, the end portion and a portion of the fixing member around the end portion forms a concave portion configured to allows the cured resin to be applied therein.

9. A light scanning device comprising:
    the mounting structure for a mounted component according to claim 1;
    a deflector provided at a downstream side of the mounted component in the direction along an optical axis and deflecting incident light in a direction other than the direction along the optical axis; and
    a rotating member that rotates the deflector to allow scanning of the light.

10. An image forming apparatus comprising:
    a latent image holding body;
    a charging member that charges a surface of the latent image holding body;
    the light scanning device according to claim 9, which device causes light to be scanned on the surface of the latent image holding member charged by the charging member, so as to form a latent image on the surface;
    a developing unit in which developing processing is performed by applying a developer to the latent image; and
    a transfer member that transfers a developer image from the latent image holding member to a transfer member.

11. The mounting structure for a mounted component according to claim 1, further comprising a light barrel member that holds an optical component, the light barrel member separated from the holding member by a through hole in the case body such that light from the light source may travel along the optical axis through the through hole to the optical component, the optical component positioned orthogonal to the optical axis of the light source.

* * * * *